United States Patent Office 2,821,479
Patented Jan. 28, 1958

2,821,479

FOOD COMPOSITION CONTAINING JELL PARTICLES AND METHOD OF MANUFACTURE

John H. Forkner, Fresno, Calif., assignor to Pillsbury Mills, Inc., Minneapolis, Minn., a corporation of Delaware No Drawing. Application December 21, 1955
Serial No. 554,604

7 Claims. (Cl. 99—129)

This invention relates to a dry pulverulent food composition containing discrete particles of substance capable of jelling, and to a process of manufacture.

Jelled food particles in commercial use are commonly called gum drops, fruit slices, or sliced jelled squares. A particle of this nature may be defined as a molded semi-transparent easily melted food preparation which has a soft and somewhat elastic homogeneous consistency owing to the presence, with granulated and corn sugar and water, of the common jelling agents such as gelatins, pectins, gum traganth, gum arabic, agar agar, Irish moss and starch, some of the foregoing agents requiring conversion by boiling in the presence of an acid.

The present invention is concerned with that class of jelled food particles commercially made by confectioners. In the manufacture of jelled candies and the like, there are two common methods employed. In one method, the jelling material is deposited in impressions molded in starch wherein the individual jell products are retained until they have cured. The other common method of forming such jelled confections consists in depositing a sheet of jelling substance on a cooling slab following which it is permitted to cool and set. The material is then generally cured in squares or slices. Deviations in the foregoing will be familiar to skilled confectioners. In the starch cast process a moisture content of from 22% to 24% is generally requisite because of limitations in the depositing equipment. After depositing the gum drop in the starch molds, which, in turn, are formed upon trays, these trays are placed in warm rooms and a setting and drying action occurs over an indefinite period of time. The overall effect is termed "curing" and is dependent upon formulation, time of standing, heat, humidity and circulation of surrounding air. Because of the fabrication of starch molds, the handling of trays and the necessity for individual filling of each and the high ratio of starch to yield of gum drop product, there is a practical limitation to the size of the conventional gum drop that can be economically produced. The smallest gum drop in commercial production of which I am aware will be retained upon a 3 mesh screen. For my purpose, hereinafter disclosed, jell particles of the smallest commercial size mentioned above are larger than I desire to use. In practicing my invention, I have been able to produce and utilize large quantities of relatively small pieces of jelled material in an economical manner. By small pieces, I particularly am desirous of producing a range of from one thousand to forty thousand pieces per pound with a preferential range of around twenty thousand pieces per pound.

In the manufacture of commercial gum drops, the pieces, when packaged, have achieved a firmness just sufficient to retain their identity in the package. The manufacturer frequently relies on storing and shipping time as a favorable feature in the final curing and firming of the product. Retaining the entire production in storage to such time as will completely cure the product is impractical because extensive production capacities of this type of operation result in excessive storage requirements. If an attempt is made by the present manufacturers of gum drops to further subdivide them into small particles of the character which I require, they experience difficulty because the particles ordinarily will not have set and cured to a point which will permit ready chopping or slicing without sticking to the equipment employed and without agglomerating thereafter.

It is within the contemplation of my invention to eliminate several of the basic conventional steps of the processing presently employed in the gum drop art and to utilize a practical method of subdividing jell particles in conjunction with their initial fabrication. As to my method of producing a food composition, the following points up the simplification of the steps employed and the improved product which is attained thereby.

In the broadest form of my invention, I take a quantity of dry pulverulent food material such as flour, sugar, nonfat milk solids, or the like, and deposit and disperse directly therein a multiplicity of my jell-producing particles which are not yet cured. The soft consistency of the gum drops I can comminute at this stage renders them difficult, if not impossible, commercially to freely comminute. Even when so comminuted by ordinary methods, the particles will stick to the equipment and to each other as they are extruded or deposited out of the equipment. I overcome this sticking and agglomerating by intimately associating, just prior to comminuting, a food premix or component thereof in major proportions to the gum drop and, thence, subdivide by such equipment as a conventional hammer mill or slicing mill. The carrying agent prevents the gum drop particles from adhering to the equipment and keeps the particles separate following comminution.

The particles are retained in dispersed relative positions throughout the entire dry mass and are not further handled or mixed because of the fragile and soft character of the incompletely cured particles. Once the particles have been dispersed in the mass, however, they are allowed to remain in situ for such remaining time as is necessary to complete the curing thereof.

It is understood that I may disperse the particles throughout a dry pulverulent mass of food material which can become a component of another food composition or I may incorporate directly the incompletely cured particles in a completely pulverulent product such as a food premix. Once the food composition is packaged with the dispersed particles incorporated into the mass of material, the package may be stored or shipped, the time required therefor providing the final requisite curing period.

As a specific example of the production of a food composition embodying my invention, I commence with a liquid jell material properly formulated in accordance with published art. I place my base ingredients in a vacuum kettle, boil for three minutes, vacuum concentrate at 27 inches of vacuum to 82% refractometer reading and, thence, deposit in strips on a conveyor belt with a desired premix or component thereof. After cooling on the continuous conveyor for thirty minutes, I cut the strips into desired lengths and, thence, feed the mass into suitable comminuting equipment. Immediately following comminution, I continuously mix the mass to provide an intimate association thereto by conventional mixing equipment as, for example, a vibrating screen. This is done to off-set the natural separation that takes place in the comminuting equipment. Thereafter, in the case of a premix, I may scale and package; or if a component of a premix, I may package, or at this stage continuously mix with the other ingredients of the premix.

It is to be noted that, in all events, the curing of the discrete and dispersed particles continues, whether in bulk or package form or whether in a component or in the completed premix material.

The end use of the product of this invention requires firm bodied, well cured discrete particles as a component of the premix to retain their identity during subsequent mixing with the inclusion of moisture and final processing of the premix. This may be illustrated by exemplary premixes in which I may incorporate small particles of gum drop particles as, for example, bakery cake mixes, ice cream premixes, gelatin desserts, custards and processed cheese mixes.

It may thus be seen that my process not only simplifies the conventional handling of jell-producing pieces, but makes possible the subdivision thereof directly in a premix or component thereof, the mixture becoming a useful food combination which provides its own curing facilities.

What I claim is:

1. A food composition comprising a mass of pulverulent food material, and a plurality of discrete, soft and incompletely cured jell particles dispersed throughout the dry mass, said particles having an aggregate weight in minor proportion compared to that of the rest of said food composition.

2. A food composition comprising a mass of dry pulverulent food material, and a plurality of discrete, soft and incompletely cured jell particles, a major portion of which particles lie between 16 mesh and 3 mesh, said particles further having an aggregate weight in minor proportion compared to that of the rest of said food composition.

3. An article of commerce comprising a packaged quantity of a food composition having a mass of dry pulverulent composition, and a plurality of discrete, soft and incompletely cured jell particles dispersed throughout the dry mass, said particles having an aggregate weight in minor proportion compared to that of the rest of said food composition.

4. A process for the manufacture of a new food composition which consists in depositing and dispersing a plurality of jell-producing particles in a mass of dry pulverulent food material, then curing the jell-producing particles in situ.

5. A process for the manufacture of a new food composition which consists in incorporating a plurality of discrete jell-producing particles in a mass of dry pulverulent food material, packaging the material together with the particles and permitting the particles to cure.

6. A process for the manufacture of a new food composition which consists in depositing and dispersing a plurality of jell-producing particles in a predetermined quantity of food premix, packaging the material and permitting the particles to cure.

7. A process for the manufacture of a food composition which consists in producing a body of partially cured jell substance, comminuting into subdivided particles the substance, depositing and dispersing the particles in a mass of dry pulverulent food material, then continuing to cure the particles in situ.

References Cited in the file of this patent

UNITED STATES PATENTS

| 1,949,657 | Preston | Mar. 6, 1934 |
| 2,097,143 | Campbell | Oct. 26, 1937 |
| 2,299,288 | Whymper | Oct. 20, 1942 |

FOREIGN PATENTS

| 667,114 | Great Britain | Feb. 27, 1952 |